United States Patent [19]

Loewe et al.

[11] Patent Number: 4,685,036

[45] Date of Patent: Aug. 4, 1987

[54] HEADLIGHT FOR ANTIDAZZLE LIGHTS OF MOTOR VEHICLES

[75] Inventors: Richard Loewe, Gerlingen; Peter Perthus, Stuttgart, both of Fed. Rep. of Germany

[73] Assignee: Robert Bosch GmbH, Stuttgart, Fed. Rep. of Germany

[21] Appl. No.: 822,621

[22] Filed: Jan. 24, 1986

[30] Foreign Application Priority Data

Apr. 30, 1985 [DE] Fed. Rep. of Germany ....... 3515493

[51] Int. Cl.[4] ............ B60Q 1/00

[52] U.S. Cl. ............ 362/61; 362/317

[58] Field of Search ............ 362/61, 317, 214, 434, 362/455, 296

[56] References Cited

U.S. PATENT DOCUMENTS

| | | | |
|---|---|---|---|
| 2,006,899 | 7/1935 | Levy | 362/61 |
| 2,169,531 | 8/1939 | Jennings | 362/61 |
| 2,273,951 | 2/1942 | Gibb | 362/61 |
| 2,550,594 | 4/1951 | Petrakakis | 362/61 |
| 2,629,815 | 2/1953 | Grupon et al. | 362/61 |
| 3,088,023 | 4/1963 | Ayroldi | 362/61 |
| 3,818,210 | 6/1974 | Pitkjaan | 362/61 |
| 4,225,904 | 9/1980 | Linder | 362/61 |
| 4,555,748 | 11/1985 | Bradley | 362/61 |

*Primary Examiner*—Raymond A. Nelli
*Attorney, Agent, or Firm*—Michael J. Striker

[57] ABSTRACT

In the headlight of a motor vehicle, a holder of the objective is secured against rotation but is axially displaceable in the housing of the headlight. In order to adjust a width of cut of the objective a rotatable spacer ring, provided with projections cooperating with respective projections of the housing, is positioned between the holder and the end wall of the housing so as to adjust the position of the objective on an optical axis of the headlight.

25 Claims, 7 Drawing Figures

HEADLIGHT FOR ANTIDAZZLE LIGHTS OF MOTOR VEHICLES

BACKGROUND OF THE INVENTION

The present invention relates to a headlight for a fog lamp or an antidazzle light of a motor vehicle.

Headlights of the type under discussion include a housing, a reflector, a diaphragm or light shield which partially screens off a light beam from a source of light and forms a light dark border line of the light beam, and an objective positioned in the housing.

In such headlights operated on the projection principle, a distance between the screen or shield and the objective must be adjustable in order to exclude shade zones and/or color flinge in the light-dark border line, which affect the light beam and are not allowed. This negative effect leads to certain manufacturing allowances of the objective, particularly when the lenses utilized in the objective have partially pressed outer surfaces.

SUMMARY OF THE INVENTION

It is an object of the present invention to provide an improved headlight.

It is another object of the invention to provide a headlight in which the distance between the bulk shield and the objective is adjusted by simple means.

These and other objects of the invention are attained by a headlight for a fog light of a motor vehicle, comprising a housing, a reflector on said housing, a light source positioned in said reflector, an objective having an axis and forming a light beam illuminating a roadway, said reflector having a shield for partially screening off light beams reflected by said reflector and forming a light-dark border line of the light beam, and means for adjusting an axial position of said objective.

The adjusting means may be positioned between said housing and said objective so as to adjust said width of cut.

The headlight may further include a holder surrounding and holding a peripheral edge of said objective, said holder being secured in said housing against rotation and being axially displaceable therein, said adjusting means including a spacer ring positioned in said housing and formed with at least two projections which cooperate with said housing and, upon rotation of said spacer ring about said axis, adjust said distance.

The spacer ring may have one end face which is formed with said projections, each projection being a ramp, said housing being formed with ramps cooperating with said projections, said spacer ring having the other end face opposite to said one end face, said other end face being pressed against an end face of said holder.

Each ramp of said spacer ring and said housing may have a guide rail surface.

The guide rail surface of each ramp may be a plane surface.

In the modified embodiment the guide rail surface of each ramp may be stepped or toothed.

Each of said projections may be a radially extending pin, said housing having an inner wall formed with slots inclined to said axis, each pin being engaged in a respective slot of said inner wall.

The housing may have at least one recess for providing an access to said spacer ring from outside of the headlight, said recess receiving a tool for rotation of said spacer ring.

The headlight may further include an element for securing an axial functional position of said objective and positioned in said housing against said holder, said housing having an inner cutout supporting said element in said housing.

Said element may be a circlip having an inner region lying on said holder, and resilient tongues formed on an outer region of said element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figures 1, 2, 3A, 3B, 3C, 4, 5:
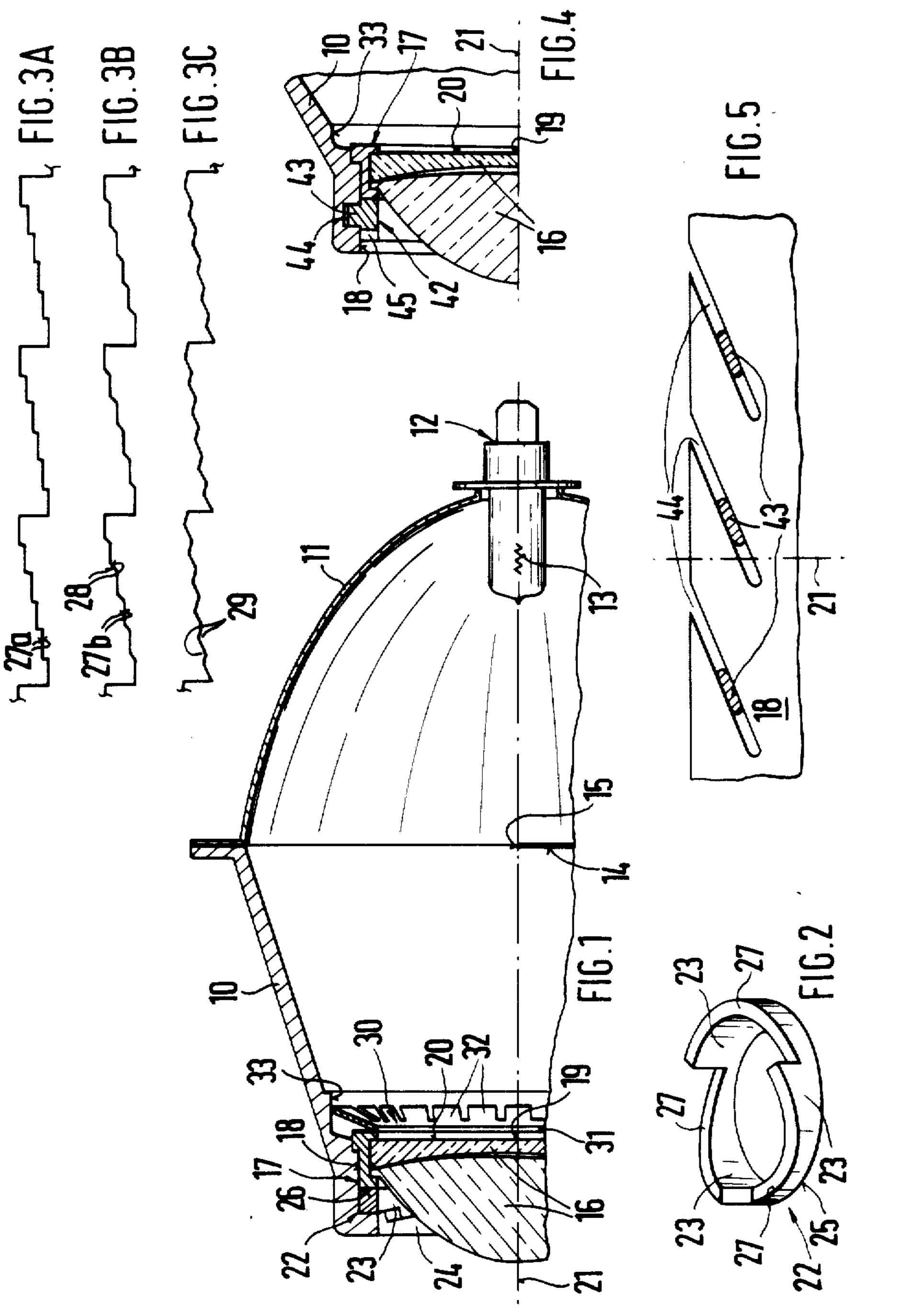
FIG. 1 is a partial axial sectional view through a headlight for a fog light of a vehicle according to the invention, on a natural scale.
FIG. 2 is a perspective view of a spacer ring with ramps, on a smaller scale.
FIGS. 3A through 3C schematically show modified surfaces of the ramps of the spacer ring of three different embodiments, respectively.
FIG. 4 is a partial axial sectional view of the region of the objective of the headlight,according to a modified embodiment of the invention, on a natural scale, and without a circlip.
FIG. 5 shows a portion of the housing provided with slots for receiving pins of the spacer ring, on an enlarged scale, in accordance with a further modification of the invention.

Referring now to the drawings in detail, and firstly to FIG. 1 thereof, it will be seen that a headlight for a fog light for motor vehicles has a housing 10 and a reflector 11 secured to the housing. A bulb 12 is inserted into reflector 11 through an apex opening thereof so that the portion accommodating a bulb filament 13 extends into the interior of the reflector 11. A diaphragm or light shield 14 screens off a portion of a light beam generated by the bulb spiral 12 and reflected by reflector 11 whereby an edge 15 of the shield 14 forms a light-dark limit or cutoff border line of the light beam.

An objective 16 of the headlight is comprised of two lenses secured in a ring-shaped holder 17 at their peripheral rims. Holder 17 is inserted in an inner wall 18 of the housing 10.

A spacer ring 22 shown in a perspective view in FIG. 2 has at one end face thereof altogether three ramps or projections 23. The spacer ring 22 is positioned between an inwardly protruding end wall of housing 10 and the end face of the holder 17. Ramps or projections 23 of the spacer ring 22 cooperate with respective opposite ramps or projections 24 provided on the end wall of the housing 10. An end face 25 opposite to the face formed with ramps 23 abuts against an adjacent end face 26 of the holder 17. The objective 16 has a lens apex 19 lying in the point of intersection of an axis 21 and a lens surface 20 of the lens facing the reflector 11.

A circlip 30 has an inner region 31 lying on the holder 17 while its outer region is formed by resilient or flexible tongues 32 which are supported on an internal cutout 33 of the housing 10. In the exemplified embodiment of objective 16, the axial adjustment of the latter is carried out by the spacer ring 22; this functional position of the objective 16 is secured by the circlip 30.

As shown in FIG. 2 each ramp or projection 23 has a guide rail or surface 27. The opposing ramps 24 provided on the housing also have guide rails or surfaces. These guide rails can be plane surfaces. These guide rails can be also stepped. Steps 27*a* are provided in the embodiment illustrated in FIG. 3A. Steps 27*b* shown in the embodiment of FIG. 3B are separated from each other by ascending oblique surfaces 28. The guide rails of the embodiment of FIG. 3C have teeth 29 positioned one after the other.

In the second embodiment, the spacer or distance ring 42 shown in FIGS. 4 and 5, has three radially projecting pins 43. Three respective slots 44 are formed in the inner wall 18 of the housing 10. Slots 44 are extended obliquely to the axis 21, and each bin 43 is engaged in the respective slot 44. Two recesses 45, offset from each other by 180°, are provided at the front side of the spacer ring 42. A non-illustrated tool for rotating the spacer ring can be inserted into those recesses. Recesses 45 are accessible from the outside of the headlight.

The so called operating width of the headlight is the distance between the lens apex 19 and the edge 15 of the shield 14. Adjustability of the distance can be also obtained by material removal of the housing 10 and/or objective during the manufacture of these structural components 16 as well as the spacer ring 22, 42 which is positioned between the housing 10 and the objective 16.

It will be understood that each of the elements described above, or two or more together, may also find a useful application in other types of headlights for fog lamps differing from the types described above.

While the invention has been illustrated and described as embodied in a headlight for fog lights, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claim;

1. A headlight for a fog light of a motor vehicle, comprising a housing and a reflector attached to said housing to form an interior of the headlight, said headlight having an optical axis; a light source positioned in said reflector, an objective partially positioned in said interior and having an axis extending along said optical axis and forming a light beam illuminating a roadway, said reflector having a shield positioned in said interior for partially screening off light beams reflected by said reflector and having an edge forming a light-dark border line of the light beam, said objective having a lens apex positioned in the point of intersection of said optical axis and a lens surface facing said reflector, said edge of said shield being spaced from said lens apex along said optical axis by a variable distance; and means for adjusting an axial position of said objective on said optical axis so as to adjust said variable distance.

2. The headlight as defined in claim 1, wherein said adjusting means is positioned between said housing and said objective so as to adjust said variable distance.

3. The headlight as defined in claim 2, further including a holder surrounding and holding a peripheral edge of said objective, said holder being secured in said housing against rotation and being axially displaceable therein, said adjusting means including a spacer ring formed with at least two projections which cooperate with said housing and, upon rotation of said spacer ring about said axis, adjust said variable distance.

4. The headlight as defined in claim 3, wherein said spacer ring has one end face which is formed with said projections, each projection being a ramp, said housing being formed with ramps cooperating with said projections, said spacer ring having the other end face opposite to said one end face, said other end face being pressed against an end face of said holder.

5. The headlight as defined in claim 4, wherein each ramp of said spacer ring and said housing has a guide rail surface.

6. The headlight as defined in claim 5, wherein said guide rail surface of each ramp is a plane surface.

7. The headlight as defined in claim 5, wherein said guide rail surface is stepped.

8. The headlight as defined in claim 5, wherein said guide rail surface has steps connected to each other by oblique surfaces.

9. The headlight as defined in claim 5, wherein said guide rail surface is toothed.

10. The headlight as defined in claim 4, wherein each of said projections is a radially extending pin, said housing having an inner wall formed with slots inclined to said axis, each pin being engaged in a respective slot of said inner wall.

11. The headlight as defined in claim 4, wherein said housing has at least one recess for providing an access to said spacer ring from outside of the headlight, said recess receiving a tool for rotation of said spacer ring.

12. The headlight as defined in claim 4; further including an element for securing an axial functional position of said objective and positioned in said housing against said holder, said housing having an inner cutout supporting said element in said housing.

13. The headlight as defined in claim 12, wherein said element is a circlip having an inner region lying on said holder, and resilient tongues formed on an outer region of said element, said outer region being supported at said cutout.

14. A headlight for a fog light of a motor vehicle, comprising a housing and a reflector attached to said housing to form an interior of the headlight, said headlight having an optical axis; a light source positioned in said reflector, an objective partially positioned in said interior and having an axis extending along said optical axis and forming a light beam illuminating a roadway, said reflector having a shield positioned in said interior for partially screening off light bemas reflected by said reflector and having an edge forming a light-dark border line of the light beam, said objective having a lens apex positioned in the point of intersection of said optical axis and a lens surface facing said reflector, said edge of said shield being spaced from said lens apex along said optical axis by a variable distance; and means for adjusting an axial position of said objective on said optical axis so as to adjust said variable distance, said adjusting means being positioned between said housing and said objective.

15. A headlight for a fog light of a motor vehicle, commprising a housing and a reflector attached to said housing to form an interior of the heasdlight, said headlight having an optical axis; a light source positoned in said reflector, an objective partially positioned in said interior and having an axis extending along said optical axis and forming a light beam illuminating a roadway, said reflector having a shield positioned in said interior for poartially screening off light beams reflected by said reflector and having an edge forming a light-dark border line of the light beam, said objective having a lens apex positioned in the point of intersection of said optical axis and a lens surface facing said reflector, said edge of said sh8ield being spaced from said lens apex along said optical axis by a variable distance; and means for adjusting an axial positon of said objective on said optial axis so as to to adjust said varaible distance, said adjusting means being positioned between said housing and said objective and including a spacer ring formed with at least two projections which cooperate with said housing and, upon rotation of said spacer ring about said axis, adjust said variable distance.

16. The headlight as defined in claim 14, further including a holder surrounding and holding a peripheral edge of said objective, said holder being secured in said housing against rotation and being axially displaceable therein, wherein said spacer ring has one end face which is formed with said projections, each projection being a ramp, said housing being formed with ramps cooperating with said projections, said spacer ring having the other end face opposite to said one end face, said other end face being pressed against an end face of said holder.

17. The headlight as defined in claim 16, wherein each ramp of said spacer ring and said housing has a guide rail surface.

18. The headlight as defined in claim 17, wherein said guide rail surface of each ramp is a plane surface.

19. The headlight as defined in claim 17, wherein said guide rail surface is stepped.

20. The headlight as defined in claim 17, wherein said guide rail surface has steps connected to each other by inclined surfaces.

21. The headlight as defined in claim 17, wherein said guide rail surface is toothed.

22. The headlight as defined in claim 16, wherein each of said projections is a radially extending pin, said housing having an inner wall formed with slots inclined to said axis, each pin being engaged in a respective slot of said inner wall.

23. The headlight as defined in cliam 16, wherein said housing has at least one recess for providing an access to said spacer ring from outside of the headlight, said recess receiving a tool for rotation of said spacer ring.

24. The headlight as defined in claim 16, further including an element for securing an axial functional position of said objective and positioned in said housing against said holder, said housing having an inner cutout supporting said element in said housing.

25. The headlight as defined in claim 24, wherein said element is a circlip having an inner region lying on said holder, and resilient tongues formed on an outer region of said element, said outer region being supported at said cutout.

* * * * *